United States Patent
Preuninger et al.

(10) Patent No.: US 6,823,978 B2
(45) Date of Patent: Nov. 30, 2004

(54) CRAWLER MOUNTED TRANSFER STATION

(75) Inventors: Delbert G. Preuninger, Winfield, AL (US); Bobby J. Anthony, Bankston, AL (US)

(73) Assignee: Continental Conveyor & Equipment Company, Winfield, AL (US)

( * ) Notice: Subject to any disclaimer, the term of this patent is extended or adjusted under 35 U.S.C. 154(b) by 0 days.

(21) Appl. No.: 10/370,243

(22) Filed: Feb. 20, 2003

(65) Prior Publication Data

US 2004/0163926 A1 Aug. 26, 2004

(51) Int. Cl.⁷ .............................................. B65G 21/10
(52) U.S. Cl. .................... 198/315; 198/314; 198/316.1
(58) Field of Search .................. 198/312, 314, 198/315, 316.1, 317, 782, 825, 826

(56) References Cited

U.S. PATENT DOCUMENTS

| | | | |
|---|---|---|---|
| 3,621,983 A | * 11/1971 | Arentzen et al. | 198/313 |
| 3,782,536 A | * 1/1974 | Toney | 198/316.1 |
| 3,974,907 A | 8/1976 | Shaw et al. | |
| 4,031,997 A | 6/1977 | Nelson | |
| 4,090,601 A | * 5/1978 | Freed, Jr. | 198/316.1 |
| 4,361,219 A | * 11/1982 | Aldridge et al. | 198/315 |
| 4,596,424 A | 6/1986 | Wilcox, Jr. et al. | |
| 4,758,049 A | 7/1988 | Wernigg et al. | |
| 4,784,257 A | 11/1988 | Doerr | |
| 5,033,605 A | * 7/1991 | Marquart | 198/300 |
| 5,188,208 A | * 2/1993 | Hall | 198/312 |
| 5,190,352 A | * 3/1993 | LeBegue et al. | 299/18 |
| 5,201,406 A | 4/1993 | Kellis | |
| 5,254,047 A | 10/1993 | Anderson | |
| 5,299,674 A | 4/1994 | Cusitar | |
| 5,348,130 A | * 9/1994 | Thomas | 198/312 |
| 5,353,920 A | 10/1994 | Szalankiewicz et al. | |
| 5,645,158 A | 7/1997 | Polka et al. | |
| 5,819,950 A | * 10/1998 | McCloskey | 209/241 |
| 6,006,894 A | 12/1999 | Gibbs et al. | |
| 6,035,997 A | 3/2000 | Heninger et al. | |
| 6,073,745 A | 6/2000 | Cox | |
| 6,237,753 B1 | 5/2001 | Walter et al. | |
| 6,247,758 B1 | 6/2001 | Schupphaus | |

* cited by examiner

*Primary Examiner*—Douglas Hess
(74) *Attorney, Agent, or Firm*—Pearne & Gordon LLP

(57) ABSTRACT

A transfer station for a material conveyor system. The transfer station includes a portion for engaging a ground surface and for moving the transfer station relative to the ground surface. The transfer station includes a portion for supporting a conveyor belt, which has a longitudinal extent and which supports material, for movement relative to the ground in the direction of the longitudinal extent of the belt. The transfer station includes a portion for applying a skewing force against the belt to maintain the belt at a location relative to the means for supporting during movement of the belt.

9 Claims, 4 Drawing Sheets

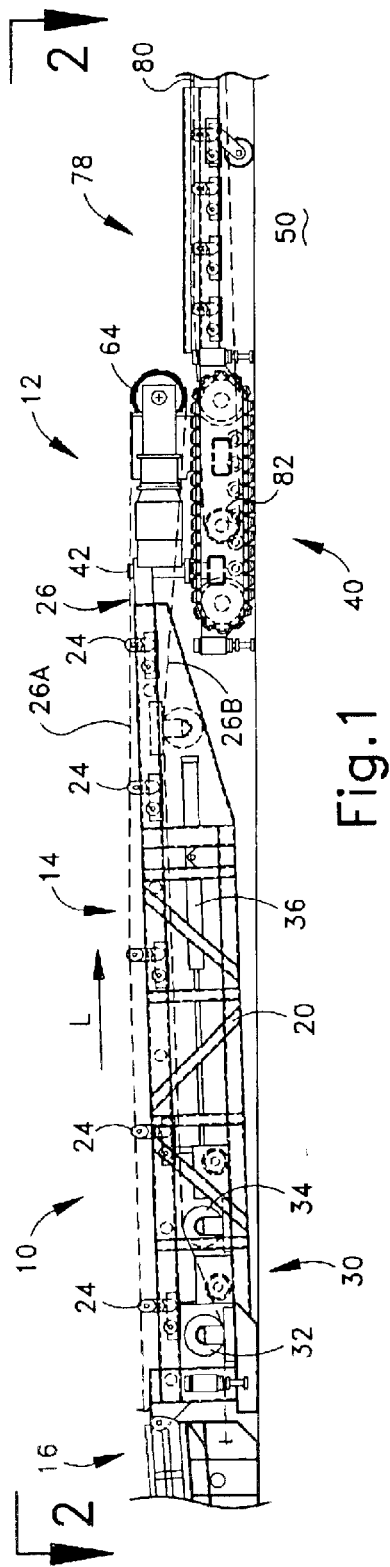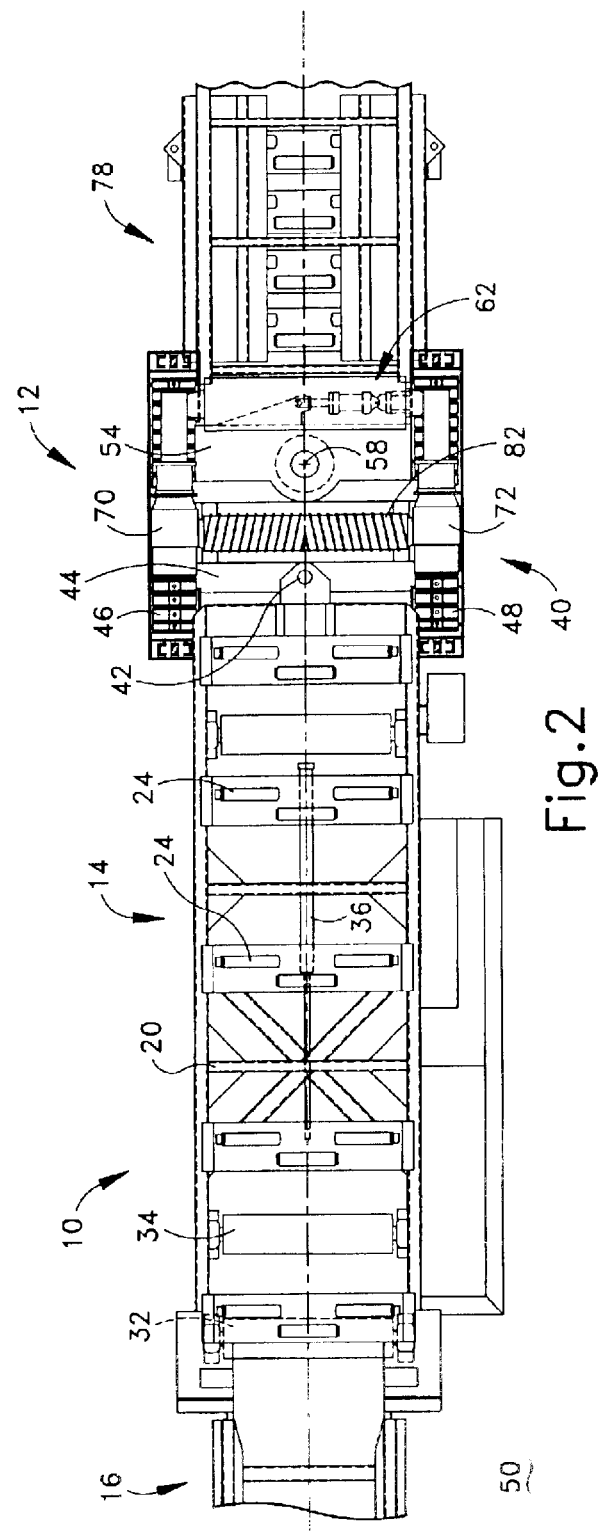

CRAWLER MOUNTED TRANSFER STATION

FIELD OF THE INVENTION

The present invention relates to a transfer station for a material conveyor system, and specifically relates to a transfer station that maintains a conveyor belt at a location relative to conveyor supports.

BACKGROUND OF THE INVENTION

It is known to utilize various mechanized and automated machines to improve the efficiency of removing mined material, such as coal, from within a mining operation. Often, the location of actual excavation of the mined material is a considerable distance away from the location at which the mined material is desired to be deposited or accumulated (e.g., an opening into the mine). Such a condition often occurs within long wall mining and low seam mining. The distance between the excavation work area and the final location to deposit the mined material may be more than one mile long.

It is known to utilize continuous loop conveyor belts to transport the mined material over such great distances. Such conveyor belts are supported by components that include various rollers, guides, and drive pulleys, such that the material-laden conveyor belt is circulated to move the mined material. Obviously, for relatively long distances to transfer the material, there is some desire to use relatively long conveyor belt arrangements. However, it is to be appreciated that conveyor belts must be maintained in an aligned orientation with regard to the supporting structure (e.g., rollers, pulleys, a framework, etc.). Belts that are relatively long extend generally have a relatively greater need for alignment than belts having a relatively short extent. Any angular offset from precise alignment can result in a progressively increasing transverse offset along the longitudinal extent of the conveyor belt. As such, even a small angular offset can result in a problematic misalignment if the length of the conveyor belt is sufficiently long and some sort of corrective measure is not undertaken. Problems that can arise with regard to misalignment of a conveyor belt include unwanted abrading of the conveyor belt against the supporting structure.

SUMMARY OF THE INVENTION

In accordance with one aspect, the present invention provides a transfer station for a material conveyor system. The transfer station includes means for engaging a ground surface and for moving the transfer station relative to the ground surface. The transfer station includes means for supporting a conveyor belt, which has a longitudinal extent and which supports material, for movement relative to the ground in the direction of the longitudinal extent of the belt. The transfer station includes means for applying a skewing force against the belt to maintain the belt at a location relative to the means for supporting during movement of the belt.

In accordance with another aspect, the present invention provides a transfer station for a material conveyor system. The transfer station includes a motor-driven crawler. The transfer station includes a series of conveyor belt supports that are spaced to receive an extent of a longitudinally extending conveyor belt. A last of the supports is a pulley and is located where the belt is redirected for a return. The pulley has two ends. The transfer station includes a movable mount on which the last of the supports is mounted and that displaces one pulley end relative to the other pulley end with respect to a longitudinal extent of the belt.

In accordance with another aspect, the present invention provides a transfer station for a material conveyor system. The transfer station includes a motor-driven crawler. The transfer station includes a series of conveyor belt supports that are spaced to receive an extent of a longitudinally extending conveyor belt. A last of the supports is located where the belt is redirected for a return. The transfer station includes a pivotal mount on which the last of the supports is mounted and that pivots about an axis that is transverse to a longitudinal extent of the belt.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 1 is a side view of a portion of a material conveyor system that includes a transfer station in accordance with the present invention:

FIG. 2 is a plan view taken along lines 2—2 in FIG. 1;

DESCRIPTION OF AN EXAMPLE EMBODIMENT

Figure 3:
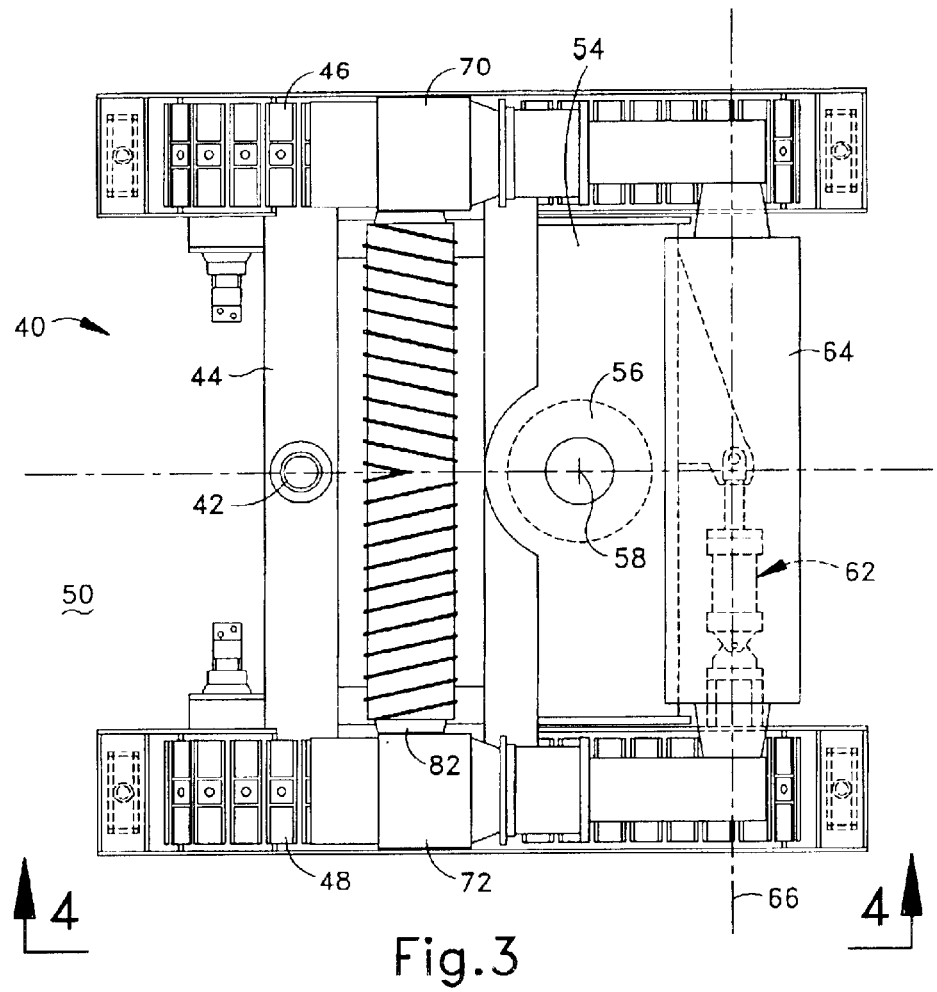
FIG. 3 is an enlarged view of a portion of the transfer station shown in FIG. 2.

An example of a portion of a material conveyor system 10, which includes an example of a transfer station 12 in accordance with the present invention, is shown in FIGS. 1 and 2. It is to be appreciated that the conveyor system 10 may include many additional components that are not shown in FIGS. 1 and 2. The conveyor system 10 may be utilized to move material over relatively long distances. In one example, the conveyor system 10 is utilized in a mining environment to move mined material, such as coal, over a large distance (e.g., the distance between a material removal location to a deposit location, such as an opening of a mine). With reference to FIGS. 1 and 2, the material removal location is located off FIGS. 1 and 2 to the left, as the figures are viewed, and the deposit location is located off to the right. As such, the left side of FIGS. 1 and 2 can be considered an upstream side and the right side of FIGS. 1 and 2 can be considered the down stream side.

The transfer station 12 includes a trailer assembly 14 that is connected to a transition section assembly 16. The trailer assembly 14 includes a frame 20 and a plurality of conveyor belt supports 24 mounted on the frame. An elongate conveyor belt 26 (shown in phantom in FIG. 1 and not shown in FIG. 2 to permit viewing of other structures) extends horizontally at least along the trailer assembly 14 and, if desired, along other components of the conveyor system 10. An arrowhead L in FIG. 1 indicates the longitudinal extent (e.g., along the left-right extent of FIG. 1) of the conveyor belt 26.

Although the conveyor belt 26 is not shown in FIG. 2, the plan view of FIG. 2 provides a reference of the width of the conveyor belt 26 that is carried on the transfer station 12. A first segment 26A (FIG. 1) of the conveyor belt 26 extends along an upper portion of the trailer assembly 14 as the conveyor belt moves the material (moving toward the right as viewed in FIGS. 1 and 2, and indicated by the head of the arrowhead L). The first segment 26A is supported at least in part by the plurality of conveyor belt supports 24. The first segment 26A of the conveyor belt is the material-carrying segment, in that the conveyed material (e.g., coal) is located thereon during conveyance.

The conveyor belt 26 has any suitable construction for conveying the material as the conveyor belt is moved. In general, the conveyor belt 26 is made of durable, yet flexible materials. The belt supports 24 may have any suitable structure for supporting the first segment 26A of the conveyor belt 26 for movement relative to the supporting frame 20 of the trailer assembly 14. As such, the belt supports 24 may include any suitable combination of rollers, pulleys, guides, and the like that cooperate with the construction of the conveyor belt 26. For example, the belt supports 24 and the conveyor belt 26 may be configured and cooperate to provide a trough-like shape for a portion of the first belt segment 26A to aid in the carrying of the conveyed material.

A returning segment 26B of the conveyor belt 26 extends below the first segment 26A (generally moving toward the left as viewed in FIG. 1). In the shown example of the transfer station 12, a belt tensioning arrangement 30 is also provided and interacts with the returning segment 26B. It is to be appreciated that the belt tensioning arrangement 30 may be provided at some other location within the material conveyor system 10. Turning to the example belt tensioning arrangement 30, the conveyor belt 26 extends between at least two pulleys 32, 34 in a somewhat serpentine fashion. One of the pulleys 34 is moveable, via a hydraulically extensible piston arrangement 36 of the belt tensioning arrangement 30, to vary the distance between the pulleys 32 and 34 and thereby change the amount of the conveyor belt 26 that is guided in the serpentine fashion by the pulleys. The amount of the conveyor belt 26 that is used within the serpentine portion is related to the tension of the conveyor belt. For example, increasing the amount of the conveyor belt 26 that is within the serpentine portion increases tension within the conveyor belt.

Figure 4:
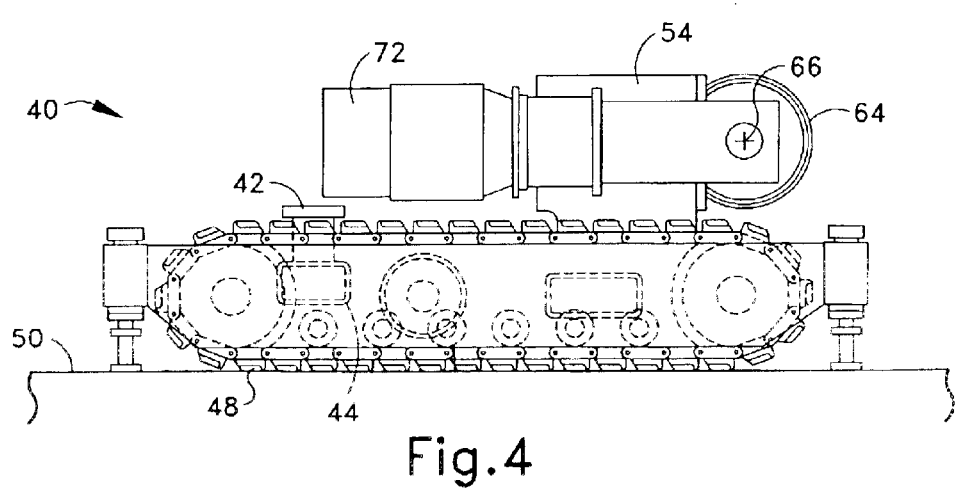
FIG. 4 is a side view taken along line 4—4 in FIG. 3.
Figure 5:
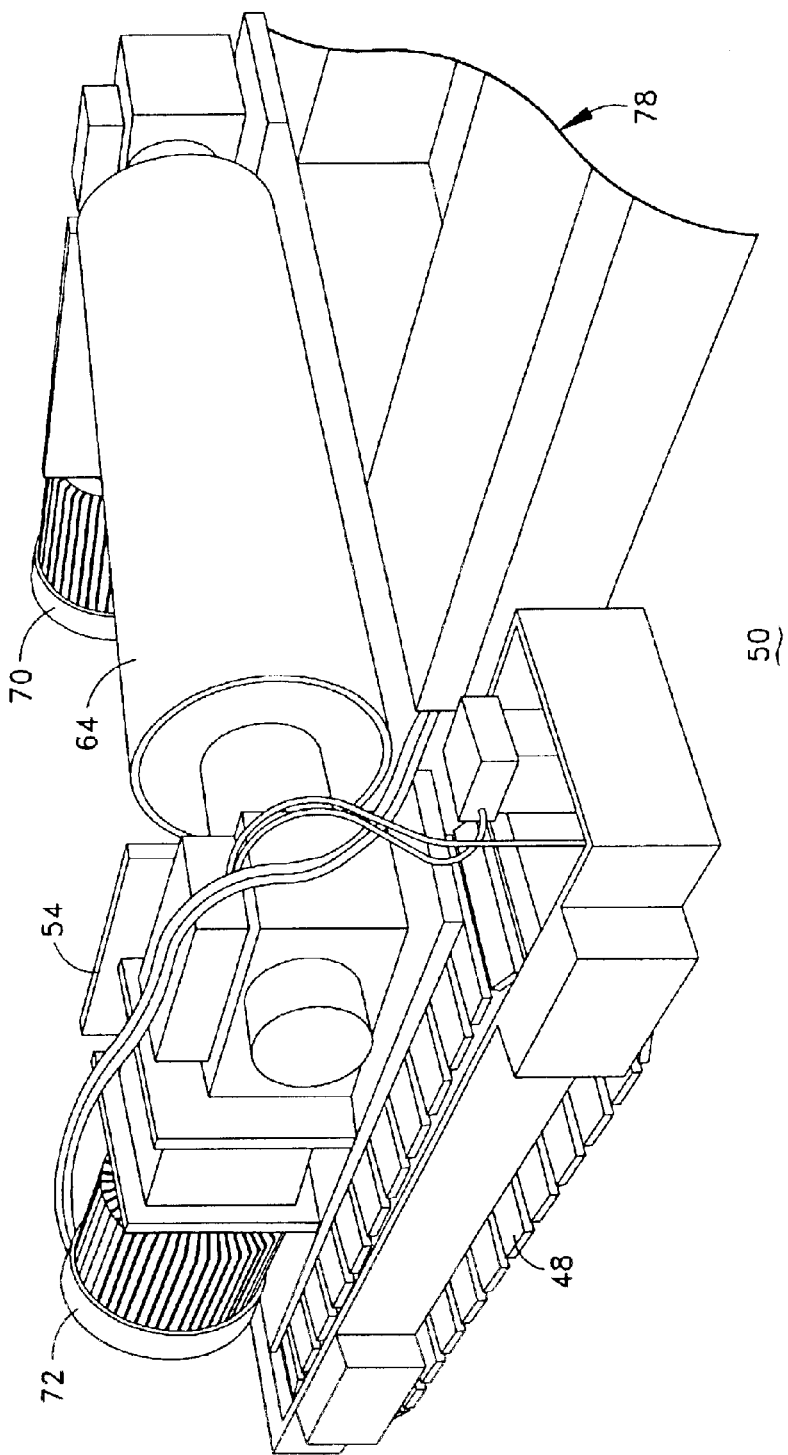
FIG. 5 is a perspective view of the transfer station showing primarily the portion shown in FIG. 4.

Turning back to the structure of the overall transfer station 12, the transfer station includes a crawler-mounted transfer and drive assembly 40. FIGS. 3 and 4 only show the transfer and drive assembly 40 and do not show other components of the conveyor system 10 to provide for ease of understanding of the structure of the transfer and drive assembly. FIG. 5 provides a perspective view that includes the transfer and drive assembly 40 for additional understanding of the structure of the transfer and drive assembly.

In the shown example of the conveyor system 10 (FIG. 1), the transfer and drive assembly 40 is pivotally connected 42 to the trailer assembly 14. The transfer and drive assembly 40 includes a lower framework 44 (FIG. 3), which can be referred to as a car body, and the pivot connection 42 for the trailer assembly 14 (only the transfer and drive assembly is shown in FIGS. 3 and 4) is located on the lower framework 44. In one example, the pivot connection 42 includes a pin extending vertically from the lower framework 44, and a ring/collar on the trailer assembly 14 that encircles the pin.

Also mounted on the lower framework 44 are left and right crawler drives 46 and 48 for engagement with the ground surface 50. The designations of left and right for the crawler drives (and other structures on the transfer and drive assembly 40 to be described below) are chosen only for ease of discussion and are with reference to the longitudinal extent of the conveyor belt 26 (see FIG. 1), and are specifically with reference to the direction of movement of the carrying segment 26A of the conveyor belt as is shown by the arrowhead L. It is to be appreciated that the designation of right and left as used herein for the structures of the transfer and drive assembly 40 are not referenced to the orientations of the Figures.

Each crawler drive (e.g., 46 or 48, see FIGS. 3 and 4) has suitable structure (e.g., caterpillar treads, supports, motors, etc.) to provide a motive force to move the transfer and drive assembly 40, and thus the entire transfer station 12, relative to the ground surface 50. The lower framework 44 includes portions connected to the left and right crawler drives 46 and 48 and portions extending transverse between the crawler drives. As such, the lower framework 44 is supported for movement relative to the ground surface 50 by the crawler drives 46 and 48.

The crawler drives 46 and 48 can be operated in concert to move the transfer station 12 either a forward direction (e.g., rightward as viewed in FIGS. 1 and 2) or reverse direction (e.g., leftward as viewed in FIGS. 1 and 2). Each crawler drive (e.g., 46 or 48) can be operated independently, and can be operated in a forward or a reverse drive direction. This permits the crawler drives to be utilized to pivot-rotate the transfer and drive assembly 40 relative to the ground surface 50.

The pivot-rotation of the transfer and drive assembly 40 is about a vertical axis extending from the ground surface 50. Also, the pivot-rotation of the transfer and drive assembly 40 may cause pivoting between the transfer and drive assembly and the trailer assembly 14. As such, the pivoting is transverse (e.g., generally perpendicular) to the longitudinal extent of the conveyor belt 26.

An upper support framework 54 (FIG. 6) of the transfer and drive assembly 40 is pivotally connected 56 to the lower framework 44 for relative rotation between the upper and lower frameworks. In the shown example, the pivot connection 56 includes a rotary table bearing. The pivoting of the upper framework 54 is about a vertical axis 58. As such, the pivoting is transverse (e.g., generally perpendicular) to the longitudinal extent of the conveyor belt 26 (shown only in FIG. 1).

A pivot force mechanism 62 (shown in phantom within FIG. 3, to indicate that it is hidden) is operatively connected between the lower and upper frameworks 44 and 54. The pivot force mechanism 62 may have any suitable construction to cause a power-driven pivoting of the upper framework 54 relative to the lower framework 44. In the shown example, the pivot force mechanism 62 includes a hydraulically extensible piston arrangement. Specifically, a first end of the piston arrangement is connected to the lower framework 44 and second end of the piston arrangement is connected to the upper framework 54. It is to be appreciated that the pivot force mechanism is located in the space between the two crawler drives 46 and 48. As such, the pivot force mechanism is hidden behind the shown crawler drive 48 for FIG. 4 and is thus not illustrated therein.

Figure 6:
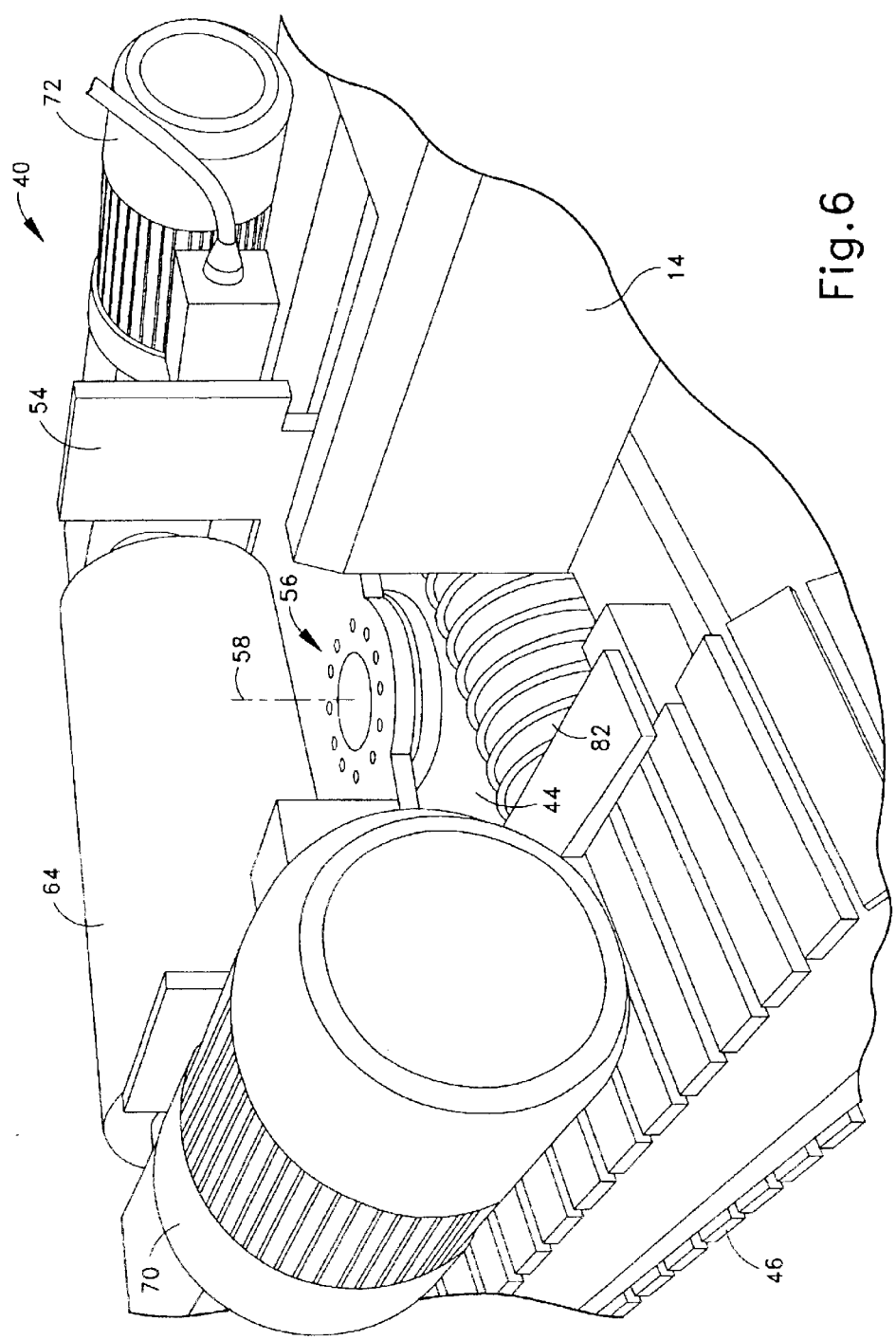
FIG. 6 is a reverse angle perspective view of the portion shown in FIG. 5.

In the shown example, the upper framework 54 has a general "U" shape (best shown in FIGS. 5 and 6). However, it is to be appreciated that additional structures (e.g., one or more reinforcing cross-members) may be provided within the upper framework 54 that one would naturally not consider as being part of the general U-shape. Specifically, it is to be appreciated that at least one cross-member (e.g., a tubular) cross-member that extends between the two sides of the U-shape, at a location generally above the pivot connection, has been removed from the drawings to permit ease of viewing of other structure.

Focusing for the moment on just the U-shape of the upper framework 54 and with attention directed to FIG. 3, a first (e.g., left) side of the U-shape is located adjacent to a first (e.g., left) side of the transfer and drive assembly 40, and a second side of the U-shape is located adjacent to a second side of the transfer and drive assembly. Portions of the upper framework 54 extend between the first and second sides. Specifically, a lower portion of the U-shape is generally flat and extends between the two sides. It is to be appreciated that the lower portion of the upper framework 54 is positioned within the space between the two crawler drives 46 and 48 and as such is hidden and not illustrated for FIG. 4. The pivot connection 56 to the upper framework 54 is located at the lower portion. Also, a portion (shown only in phantom in FIG. 3) for connection to the pivot force mechanism (e.g., the piston arrangement) 62 is hidden and not illustrated in FIG. 4.

A pulley 64 (most easily viewed in FIG. 5) is support for movement (i.e., rotation) with the upper framework 54. A rotational axis 66 (FIGS. 3 and 4) of the pulley 64 extends horizontally and extends transverse (e.g., generally perpendicular) to the longitudinal extent of the conveyor belt 26 (see FIG. 1). It is to be appreciated that the conveyor belt 26 is not shown in FIGS. 3–6 to permit ease of viewing other structures of the transfer and drive assembly 40. The conveyor belt 26 (FIG. 1) extends around the pulley 64 at the furthest extent of the conveyor belt, prior to the conveyor belt extending in the return direction. As such, the pulley 64 is the last (i.e., rightmost as viewed in FIGS. 1 and 2) support for the conveyor belt 26 and the conveyed material is discharged from the conveyor belt as the conveyor belt moves around the pulley. The pulley 64 may have a textured outer surface for engagement with the conveyor belt 26.

In the shown example, the pulley 64 is a driven pulley to impart a drive force to the conveyor belt 26. As such, the shown example includes two drive motor assemblies 70 and 72 that are operatively connected to rotate the pulley 64. The drive motor assemblies 70 and 72 are mounted on the upper framework 54, with the pulley 64 being supported there between. As such, the drive motor assemblies 70 and 72 and the supported pulley 64 move with the upper framework 54 relative to the lower framework 44. It is to be appreciated that the drive motor assemblies 70 and 72 may have any suitable construction and configuration for supporting the pulley 64 for rotation about the axis 66 and for imparting a rotational force to the pulley. For example, the drive motor assemblies 70 and 72 have bearings and the like for rotationally supporting the pulley 64, and motors (e.g., electric motors), drive shafts, and the like for providing motive force to the pulley.

As mentioned, the conveyed material is discharged from the conveyor belt 26 as the conveyor belt moves around the pulley 64. The shown example of the transfer station includes a tail loading section 78 (shown only in FIGS. 1, 2, and 5) that is operatively connected to other, non-shown, components of the conveyor system 10. A second conveyor belt 80 (Shown only in FIG. 1) is supported on the tail loading section assembly 78 to receive the material that is discharged from the conveyor belt 26. The second conveyor belt 80 extends around a pulley 82 that is rotationally-supported on the lower framework 44 of the transfer and drive assembly 40, between the crawler drives 46 and 48. Hereinafter, the conveyor belt 26 is referred to as the first conveyor belt 26.

It is to be appreciated that the conveyor system 10 and/or the transfer station 12 thereof has or may have one or more additional structural components that are not discussed herein in detail. For example, stabilizer jack components maybe located along the conveyor system 10 to engage the ground and provide a stabilizing and supporting force for the conveyor system. Also, it is to be appreciated that suitable motive force, in the form of electricity and/or hydraulic fluid, is supplied as needed for operation of the conveyor system. Such supplied electricity and/or hydraulic fluid is via connecting lines (some shown in FIGS. 5 and 6). Still further, it is to be appreciated that suitable operator controls of the various functions (e.g., movements such as rotation and pivoting of various components) are provided. Some control panels for such operator controls are schematically shown as boxes within FIG. 2.

Turning back to the aspect of the first conveyor belt 26 extending around the discharge pulley 64, it is to be appreciated that the upper framework 54, which supports the discharge pulley, is pivotable about the axis 58 relative to the lower framework 44. Pivoting of the upper framework 54 causes a movement of the pulley 64 relative to the longitudinal extent L of the first conveyor belt 26. Specifically, the movement can be considered to be a skewing movement in that one axial end of the pulley 64 is moved in a first direction along the longitudinal extent L of the first conveyor belt 26 and a second axial end of the pulley is moved in the opposite direction along the longitudinal extent of the conveyor belt. For example, the first end (e.g., the left end with reference to the longitudinal extent of the belt and the direction of movement of conveyed material, see FIGS. 1 and 2) is moved in a direction away from the trailer assembly 14, and a second end (e.g., the right end) is moved in a direction toward the trailer assembly. This pivotal (e.g., skewing) movement of the pulley 64 can provide a change in force applied to the first conveyor belt 26 by the pulley 64. For example, if one end of the pulley 64 is moved to increase its distance from the trailer assembly 14 and the other end of the pulley is moved to decrease its distance from the trailer assembly, then different pulling or tension force is applied by the two sides of the pulley. This difference in pulling or tension force can be considered to be a transverse force (i.e., transverse relative to the longitudinal extent L of the first conveyor belt 26) that can be imparted to the first conveyor belt 26. Also, this pivotal (e.g., skewing) movement of the pulley 64 can provide a slight lateral offset or change in location of the pulley 64 with reference to the bulk of the extent of the first conveyor belt 26.

Such imparting of force (e.g., transverse force) to the first conveyor belt 26 and/or lateral offset can help to maintain the first conveyor belt 26 at a location relative to the other structure of the transfer station 12. Also, such force/offset can help maintain location of the first conveyor belt 26 relative to other components within the conveyor system. For example, the first conveyor belt 26 maybe maintained at a location relative to other components of the transfer station/conveyor system such that abrading of the belt against such other structure is eliminated or reduced. As such, the movement of the discharge pulley 64 can help maintain proper or desired alignment of the first conveyor belt 26.

It should be noted that operation of one or both of the crawler drives 46 and 48 of the transfer and drive assembly 40 can provide a similar pivoting movement of the pulley 64 relative to the longitudinal extent L of the first conveyor belt 26. Such movement of the pulley 64 via operation of one or both of the crawler drives 46 and may be less precise. Also, the movement of the pulley 64 via operation of one or both of the crawler drives 46 and 48 may impart a condition to the first conveyor belt 26 that is correctable via pivotal movement of the pulley 64 by rotation of upper framework 54.

It could be considered that the crawler drives 46 and 48 of the transfer and drive assembly 40 provide for a first degree of rotational or pivot movement between the first and second conveyor belts 26 and 80, and the pivot movement of the upper framework 54 relative to the lower framework 44 provides for a second degree of rotation or pivot movement between the first and second conveyor belts. In one example, the operation of the crawler drives 46 and 48 is used to optimally position the transfer and drive assembly 40, but without final alignment with regard to the first conveyor belt 26. The upper framework 54 is then pivoted to derive a desired orientation with regard to first conveyor belt 26.

It is to be appreciated that use of the transfer and drive assembly 40 in accordance with the present invention provides for increased options with regard to the use of conveyor belts within the overall conveyor system 10. For example, it may be possible to utilize a relatively long conveyor belt within the conveyor system 10 for transfer of material over a relatively long distance. It may also be possible to utilize a relatively short conveyor belt for a segment of distance over which there may be difficulty in maintaining a proper alignment of the conveyor belt. As such, wear and tear can be allocated only to the relatively less expensive, shorter conveyor belt. Thus, the longer, relatively more expensive conveyor belt is afforded and extended useful life.

From the above description of the invention, those skilled in the art will perceive improvements, changes and modifications. Such improvements, changes and modifications within the skill the of the art are intended to be covered by the appended claims.

What is claimed is:

1. A transfer station for a material conveyor system, the transfer station including:
   means for engaging a around surface and for moving the transfer station relative to the around surface;
   means for supporting a conveyor belt, which has a longitudinal extent and which supports material, for movement relative to the around in the direction of the longitudinal extent of the belt; and
   means for applying a skewing force against the belt to maintain the belt at a location relative to the means for supporting during movement of the belt, wherein the means for applying a skewing force includes a pivotal mount that pivotally supports at least a portion of the means for supporting the conveyor belt for pivotal movement about an axis that is transverse to the longitudinal extent of the belt.

2. A transfer station as set forth in claim 1, wherein the at least a portion of the means for supporting includes a pulley that has two ends, and the pivotal movement displaces one pulley end relative to the other pulley end with respect to the longitudinal extent of the belt.

3. A transfer station as set forth in claim 1, wherein the means for engaging a ground surface and for moving the transfer station includes means for rotating at least a portion of the transfer station relative to the ground surface.

4. A transfer station as set forth in claim 4, wherein the pivotal mount is part of the portion of the transfer station rotatable relative to the ground surface, and the pivotal movement of the at least a portion of the means for supporting is relative to the portion of the transfer station rotatable relative to the ground surface.

5. A transfer station as set forth in claim 1, wherein the means for engaging a ground surface and for moving the transfer station includes means for rotating at least a portion of the transfer station relative to the ground surface.

6. A transfer station for a material conveyor system, the transfer station including:
   means for engaging a around surface and for moving the transfer station relative to the ground surface;
   means for supporting a conveyor belt, which has a longitudinal extent and which supports material, for movement relative to the around in the direction of the longitudinal extent of the belt, wherein the means for supporting includes a pulley located where the belt is redirected for a return, the pulley has two ends, and
   means for applying a skewing force against the belt to maintain the belt at a location relative to the means for supporting during movement of the belt, wherein the means for applying a skewing force includes a movable mount on which the pulley is supported for displacement of one pulley end relative to the other pulley end with respect to the longitudinal extent of the belt.

7. A transfer station as set forth in claim 6, wherein the means for engaging a ground surface and for moving the transfer station includes means for rotating at least a portion of the transfer station relative to the ground surface.

8. A transfer station for a material conveyor system, the transfer station including:
   a motor-driven crawler;
   a series of conveyor belt supports that are spaced to receive an extent of a longitudinally extending conveyor belt, a last of the supports being a pulley and being located where the belt is redirected for a return, the pulley having two ends; and
   a movable mount on which the last of the supports is mounted and that displaces one pulley end relative to the other pulley end with respect to a longitudinal extent of the belt.

9. A transfer station for a material conveyor system, the transfer station including:
   a motor-driven crawler;
   a series of conveyor belt supports that are spaced to receive an extent of a longitudinally extending conveyor belt, a last of the supports being located where the belt is redirected for a return; and
   a pivotal mount on which the last of the supports is mounted and that pivots about an axis that is transverse to a longitudinal extent of the belt.

* * * * *